(12) United States Patent
Reeves et al.

(10) Patent No.: US 8,961,059 B2
(45) Date of Patent: Feb. 24, 2015

(54) SELF-LOCKING JOINTS FOR PANEL STRUCTURES AND METHODS OF FABRICATING THE SAME

(75) Inventors: Brad J. Reeves, Everett, WA (US); Paul L. Gooch, Everett, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/605,991

(22) Filed: Sep. 6, 2012

(65) Prior Publication Data
US 2014/0064833 A1 Mar. 6, 2014

(51) Int. Cl.
*F16B 12/26* (2006.01)

(52) U.S. Cl.
USPC .......................................... 403/252; 403/381

(58) Field of Classification Search
CPC ......... F16B 12/125; F16B 5/01; A47B 43/02; B65D 5/4287; B65D 5/427
USPC .................. 403/252, 254, 375, 381, DIG. 10, 403/DIG. 11; 220/7, 62, 682
See application file for complete search history.

(56) References Cited

U.S. PATENT DOCUMENTS

| | | | | |
|---|---|---|---|---|
| 3,064,877 A | * | 11/1962 | Forrer et al. | 229/150 |
| 3,341,908 A | * | 9/1967 | Lock | 403/381 |
| 3,591,212 A | * | 7/1971 | Rhyne | 217/65 |
| 3,666,607 A | * | 5/1972 | Weissman | 428/33 |
| 3,757,445 A | * | 9/1973 | Stilwell | 40/788 |
| 5,209,367 A | * | 5/1993 | Van Musscher et al. | 229/87.01 |
| 5,770,320 A | * | 6/1998 | Hughes et al. | 428/571 |
| 5,839,651 A | * | 11/1998 | Teags et al. | 229/125.32 |
| 6,164,477 A | | 12/2000 | Druckman et al. | |
| 6,325,568 B1 | | 12/2001 | Druckman et al. | |
| 6,761,502 B2 | * | 7/2004 | Bishop et al. | 403/278 |
| 6,782,672 B2 | * | 8/2004 | Staats | 52/591.2 |
| 7,818,939 B2 | * | 10/2010 | Bearinger et al. | 52/591.1 |
| 7,887,249 B2 | * | 2/2011 | Schmitz | 403/364 |
| 7,963,038 B2 | | 6/2011 | Schmitz | |
| 2004/0065041 A1 | | 4/2004 | Staats | |
| 2012/0045278 A1 | * | 2/2012 | Schooley | 403/381 |

FOREIGN PATENT DOCUMENTS

| | | |
|---|---|---|
| EP | 0926358 A2 | 6/1999 |
| WO | WO2011151737 A2 | 12/2011 |

OTHER PUBLICATIONS

PCT Notification of Transmittal of the International Search Report and the Written Opinion of The International Searching Authority for PCT Counterpart International Application No. PCT/US2013/047308, Applicant The Boeing Company, Mailed Sep. 30, 2013, 12 pages.

\* cited by examiner

*Primary Examiner* — Joshua Kennedy

(57) ABSTRACT

A method of fabricating a self-locking joint in a panel structure. The method provides a panel structure having at least two face sheets and a core portion sandwiched therebetween. The method further fabricates in a first portion of the panel structure at least one mortice opening having self-locking end portions. The method further fabricates on a second portion of the panel structure at least one tenon extension having flexible self-locking members. The method further interlocks the flexible self-locking members of the at least one tenon extension with the self-locking end portions of the at least one mortice opening to form a self-locking joint in the panel structure.

23 Claims, 13 Drawing Sheets

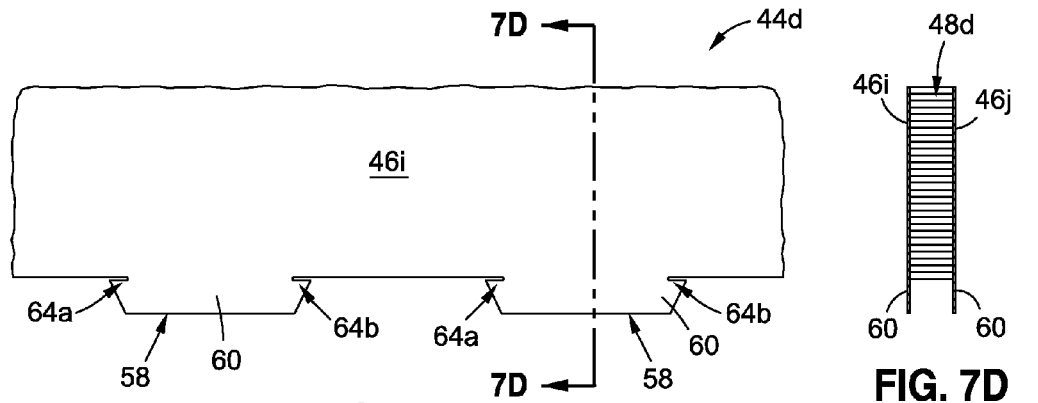
FIG. 7A
FIG. 7D
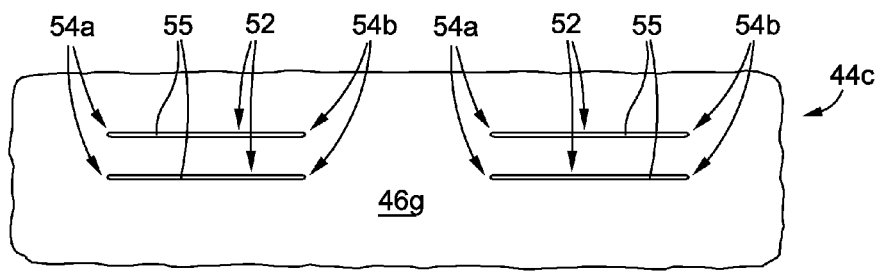
FIG. 7B
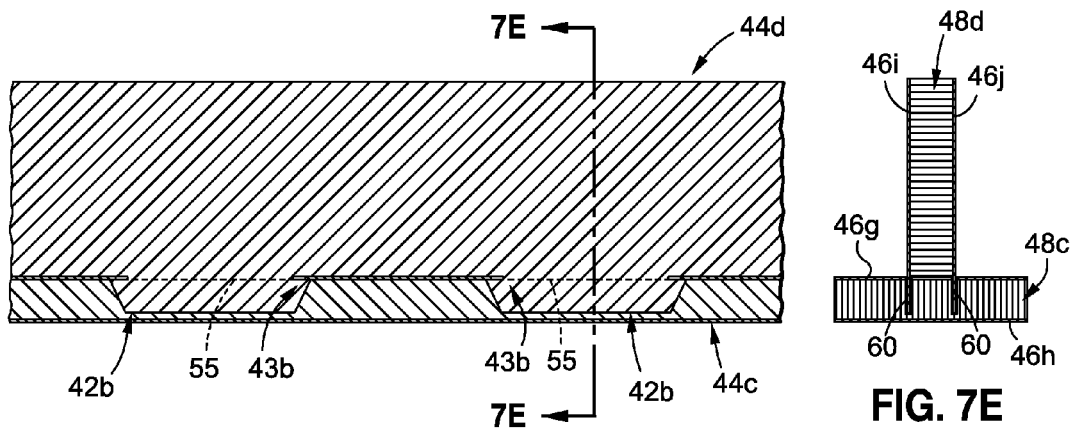
FIG. 7C
FIG. 7E

SELF-LOCKING JOINTS FOR PANEL STRUCTURES AND METHODS OF FABRICATING THE SAME

CROSS REFERENCE TO RELATED APPLICATIONS

This nonprovisional patent application is related to contemporaneously filed U.S. nonprovisional patent application Ser. No. 13/605,604, titled "METHOD AND APPARATUS FOR JOINING COMPOSITE STRUCTURES", filed on Sep. 6, 2012, the entire contents of which is incorporated herein by reference.

BACKGROUND

1) Field of the Disclosure

The disclosure relates generally to composite structures, and more specifically, to composite sandwich panel assemblies and methods for composite sandwich panel structures, such as used in aircraft.

2) Description of Related Art

Composite structures are used in a wide variety of applications. In aircraft construction, composites may be used to manufacture aircraft panel structures, such as for use in forming interior stowage bins, interior closets and interior storage compartments. Such aircraft panel structures may be joined together using mortise and tenon joint assemblies. For example, FIG. 2A is an illustration of an enlarged, fragmentary, exploded perspective view of a known mortise and tenon joint assembly 30. As shown in FIG. 2A, the known mortise and tenon joint assembly 30 has a tenon portion 32 with a tenon tab 34 adapted for insertion into a mortise opening 38 of a mortise portion 36. FIG. 2B is an illustration of an enlarged, fragmentary, perspective view of the known mortise and tenon joint assembly 30 of FIG. 2A showing the tenon tab 34 of the tenon portion 32 inserted into the corresponding mortise opening 38 of the mortise portion 36.

However, during the manufacture of aircraft panel structures, such known mortise and tenon joint assemblies typically require the use of additional fixtures, fasteners, adhesive tape, and/or clamp devices to hold such mortise and tenon joint assemblies together properly and to hold such aircraft panel structures together properly. The installation, use, and removal of such additional fixtures, fasteners, adhesive tape, and/or clamp devices may increase labor, materials, and tooling costs, which, in turn, may increase overall production costs. In addition, the installation, use, and removal of such additional fixtures, fasteners, adhesive tape, and/or clamp devices may increase the time to assemble the panel structures, which, in turn, may increase the overall production costs. Moreover, the installation and use of additional fixtures or fasteners that may not be removed after assembly may increase the overall weight of such known mortise and tenon joint assemblies and such aircraft panel structures, and in turn, may increase transportation and fuel costs.

Accordingly, there is a need in the art for improved joint assemblies for panel structures and methods of fabricating the same that provide advantages over known assemblies and methods.

SUMMARY

This need for improved joint assemblies for panel structures and methods of fabricating the same is satisfied. As discussed in the below detailed description, embodiments of improved joint assemblies for panel structures and methods of fabricating the same may provide significant advantages over known assemblies and methods.

In an embodiment of the disclosure, there is provided a method of fabricating a self-locking joint in a panel structure. The method comprises providing a panel structure comprising at least two face sheets and a core portion sandwiched therebetween. The method further comprises fabricating in a first portion of the panel structure at least one mortise opening having self-locking end portions. The method further comprises fabricating on a second portion of the panel structure at least one tenon extension having flexible self-locking members. The method further comprises interlocking the flexible self-locking members of the at least one tenon extension with the self-locking end portions of the at least one mortise opening to form a self-locking joint in the panel structure.

In another embodiment of the disclosure, there is provided a method for joining two or more panel structures together. The method comprises providing a first panel structure comprising at least two first face sheets and a first core portion sandwiched therebetween. The method further comprises fabricating in the first panel structure at least one mortise opening having self-locking end portions. The method further comprises providing a second panel structure comprising at least two second face sheets and a second core portion sandwiched therebetween. The method further comprises fabricating on the second panel structure at least one tenon extension having flexible self-locking members. The method further comprises interlocking the flexible self-locking members of the at least one tenon extension with the self-locking end portions of the at least one mortise opening to form a self-locking joint joining the first panel structure and the second panel structure together.

In another embodiment of the disclosure, there is provided a self-locking joint in a panel structure. The self-locking joint comprises at least one mortise opening formed in a first portion of a panel structure comprising at least two face sheets and a core portion sandwiched therebetween. The at least one mortise opening has self-locking end portions. The self-locking joint further comprises at least one tenon extension formed on a second portion of the panel structure. The at least one tenon extension has flexible self-locking members. The flexible self-locking members of the at least one tenon extension and the self-locking end portions of the at least one mortise opening, in combination, include interlocking elements adapted to form a self-locking joint in the panel structure.

In another embodiment of the disclosure, there is provided a self-locking joint joining two or more panel structures together. The self-locking joint comprises at least one mortise opening formed in a first panel structure comprising at least two first face sheets and a first core portion sandwiched therebetween. The at least one mortise opening has self-locking end portions. The self-locking joint further comprises at least one tenon extension formed on the second panel structure comprising at least two second face sheets and a second core portion sandwiched therebetween. The at least one tenon extension having flexible self-locking members. The flexible self-locking members of the at least one tenon extension and the self-locking end portions of the at least one mortise opening, in combination, include interlocking elements adapted to form a self-locking joint joining the first panel structure and the second panel structure together.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 7A is an illustration of an enlarged, fragmentary, front view of the second panel structure of FIG. 6A having another one of the embodiments of the tenon extension of the disclosure;

FIG. 7B is an illustration of an enlarged, fragmentary, front view of the first panel structure of FIG. 6B having another one of the embodiments of the mortise opening of the disclosure;

FIG. 7C is an illustration of a cross-sectional front view taken along lines 7C-7C of FIG. 6C of the panel structure having another one of the embodiments of the self-locking joint of the disclosure;

FIG. 7D is an illustration of a cross-sectional side view taken along lines 7C-7C of FIG. 7A;

FIG. 7E is an illustration of a cross-sectional side view taken along lines 7E-7E of FIG. 7C;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
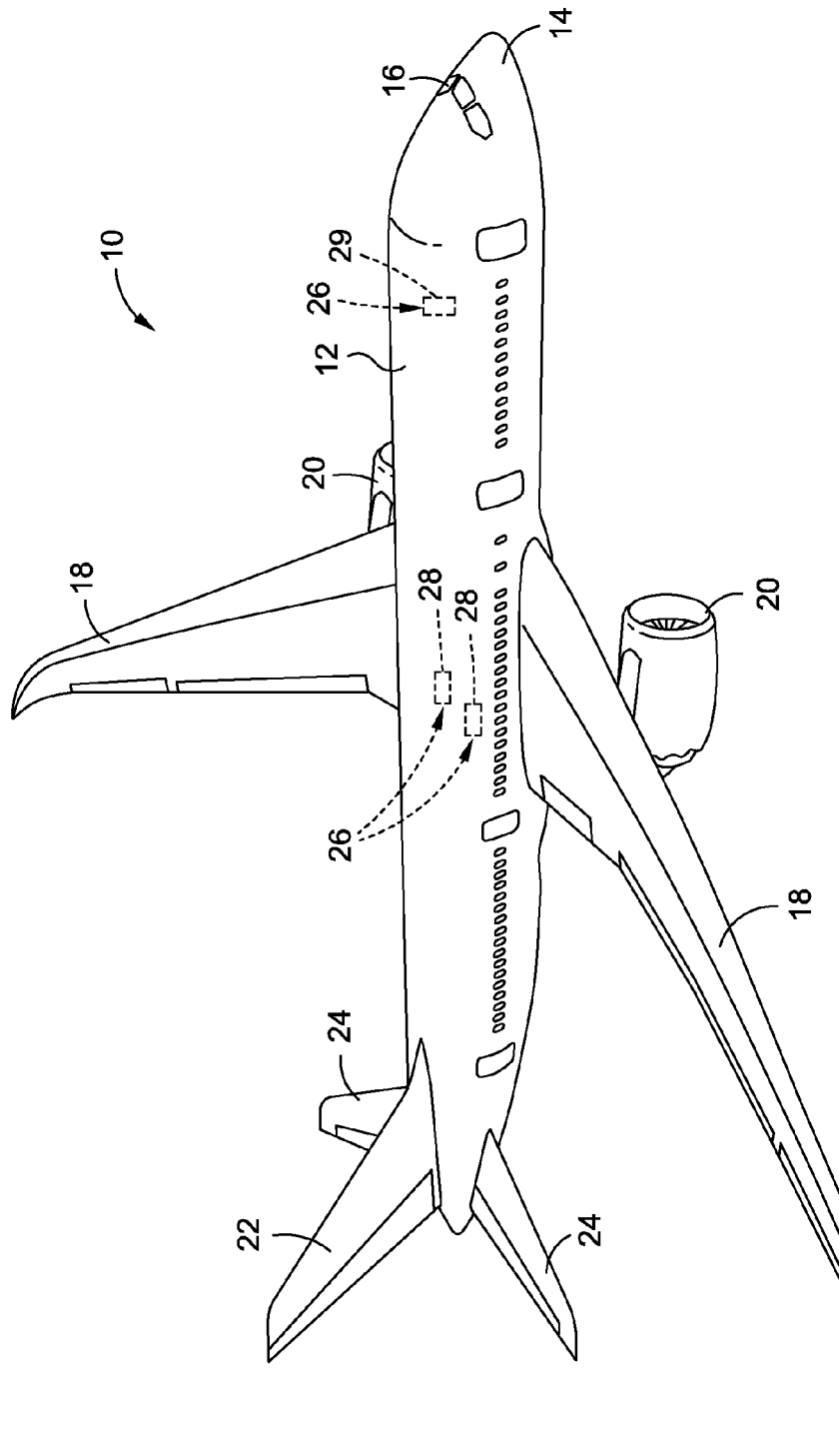
FIG. 1 is an illustration of a perspective view of an aircraft that may incorporate one or more exemplary embodiments of a structure made with one or more embodiments of a method of the disclosure.
Figure 2A:
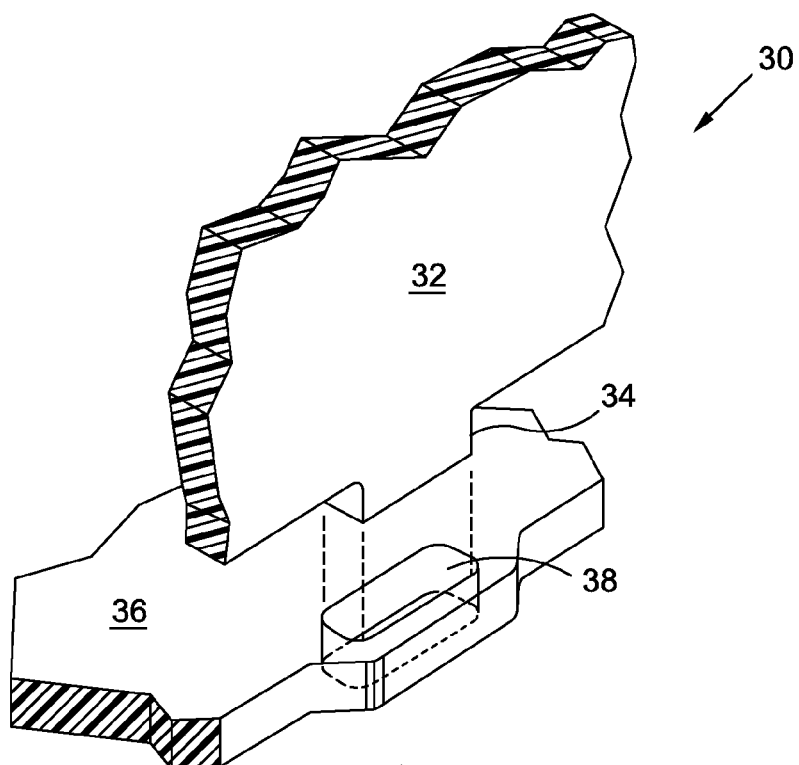
FIG. 2A is an illustration of an enlarged, fragmentary, exploded perspective view of a known mortise and tenon assembly.
Figure 2B:
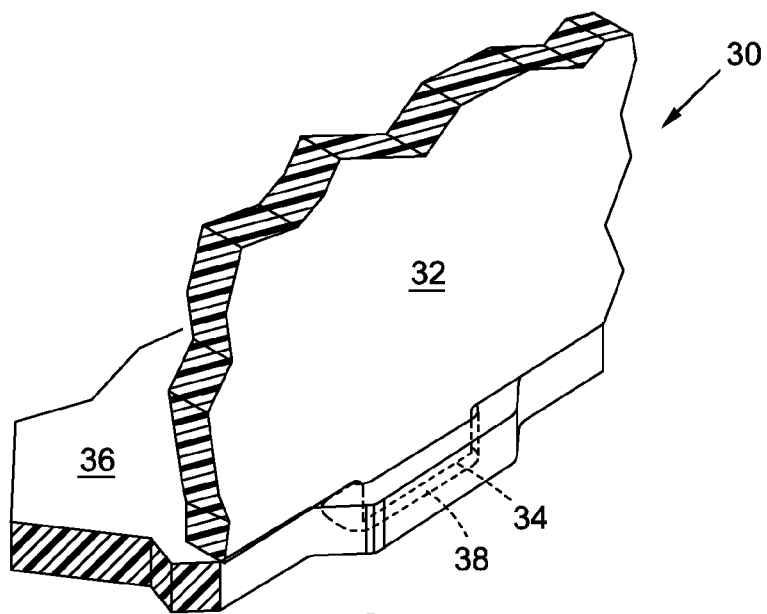
FIG. 2B is an illustration of an enlarged, fragmentary, perspective view of the known mortise and tenon assembly of FIG. 2A.

Now referring to the Figures, FIG. 1 is an illustration of a perspective view of an aircraft 10 that may incorporate one or more exemplary embodiments of a structure 26 made with one or more embodiments of a method 200 (see FIG. 10) or a method 220 (see FIG. 11) of the disclosure. As shown in FIG. 1, the aircraft 10 comprises a fuselage 12, a nose 14, a cockpit 16, wings 18, one or more propulsion units 20, a vertical tail portion 22, and horizontal tail portions 24. Although the aircraft 10 shown in FIG. 1 is generally representative of a commercial passenger aircraft having one or more structures 26, such as an aircraft interior stowage bin 28 or an aircraft interior closet 29, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable structures having one or more structures 26 made with one or more embodiments of the method 200 (see FIG. 10) or the method 220 (see FIG. 11) of the disclosure.

Figure 3A:
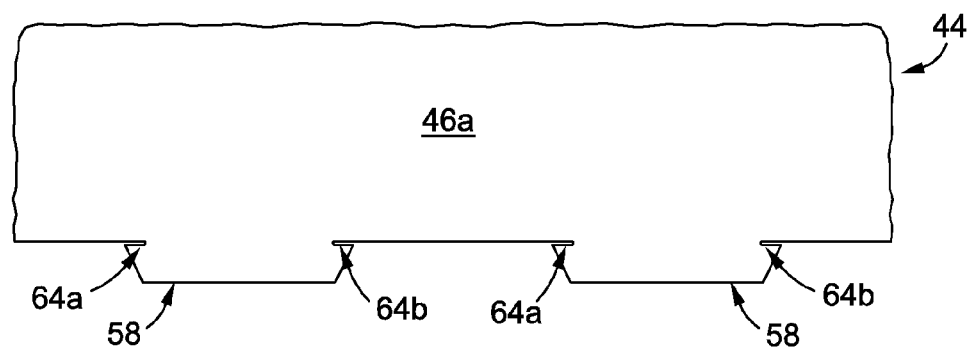
FIG. 3A is an illustration of an enlarged, fragmentary, front view of a panel structure having one of the embodiments of a tenon extension of the disclosure.
Figure 3B:
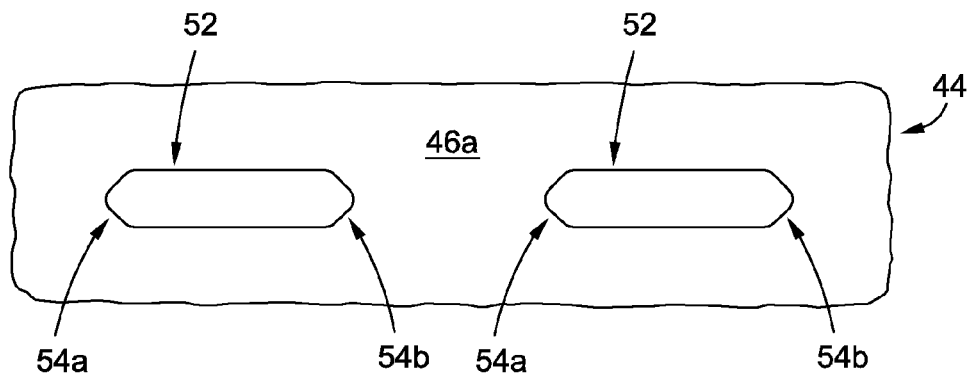
FIG. 3B is an illustration of an enlarged, fragmentary, front view of the panel structure of FIG. 3A having one of the embodiments of a mortise opening of the disclosure.
Figure 3C:
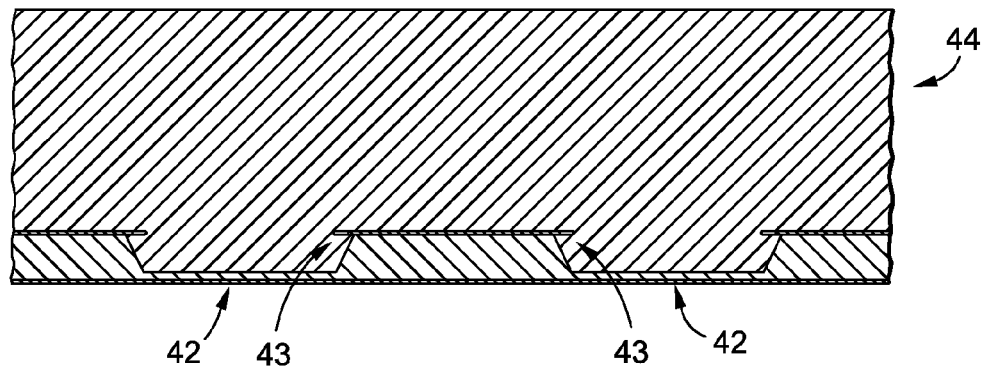
FIG. 3C is an illustration of a sectional front view of one of the embodiments of a self-locking joint of the disclosure.
Figure 8A:
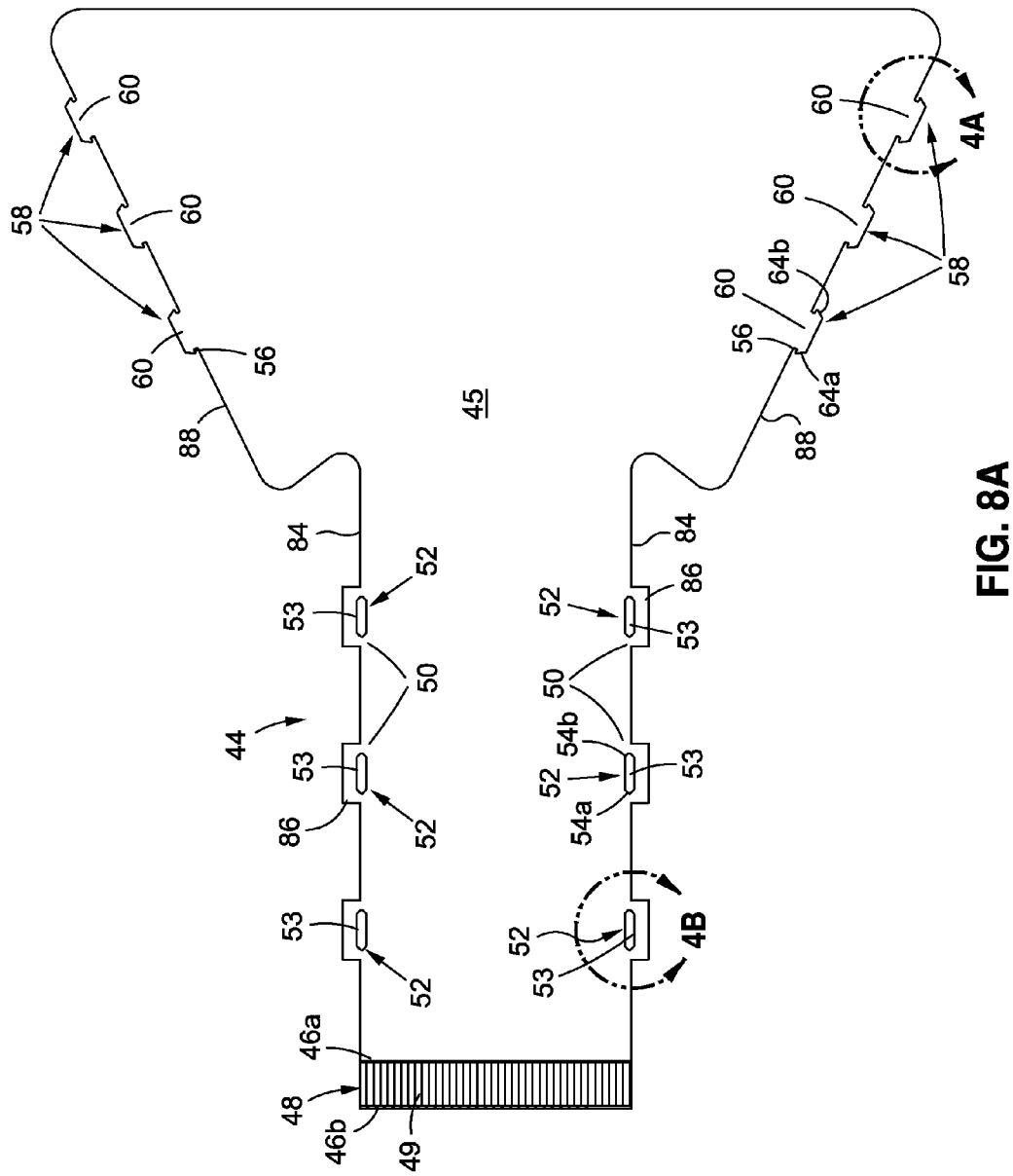
FIG. 8A is an illustration of a top perspective view of one of the embodiments of a single panel structure having tenon tabs and mortise pockets of the disclosure.
Figure 8B:
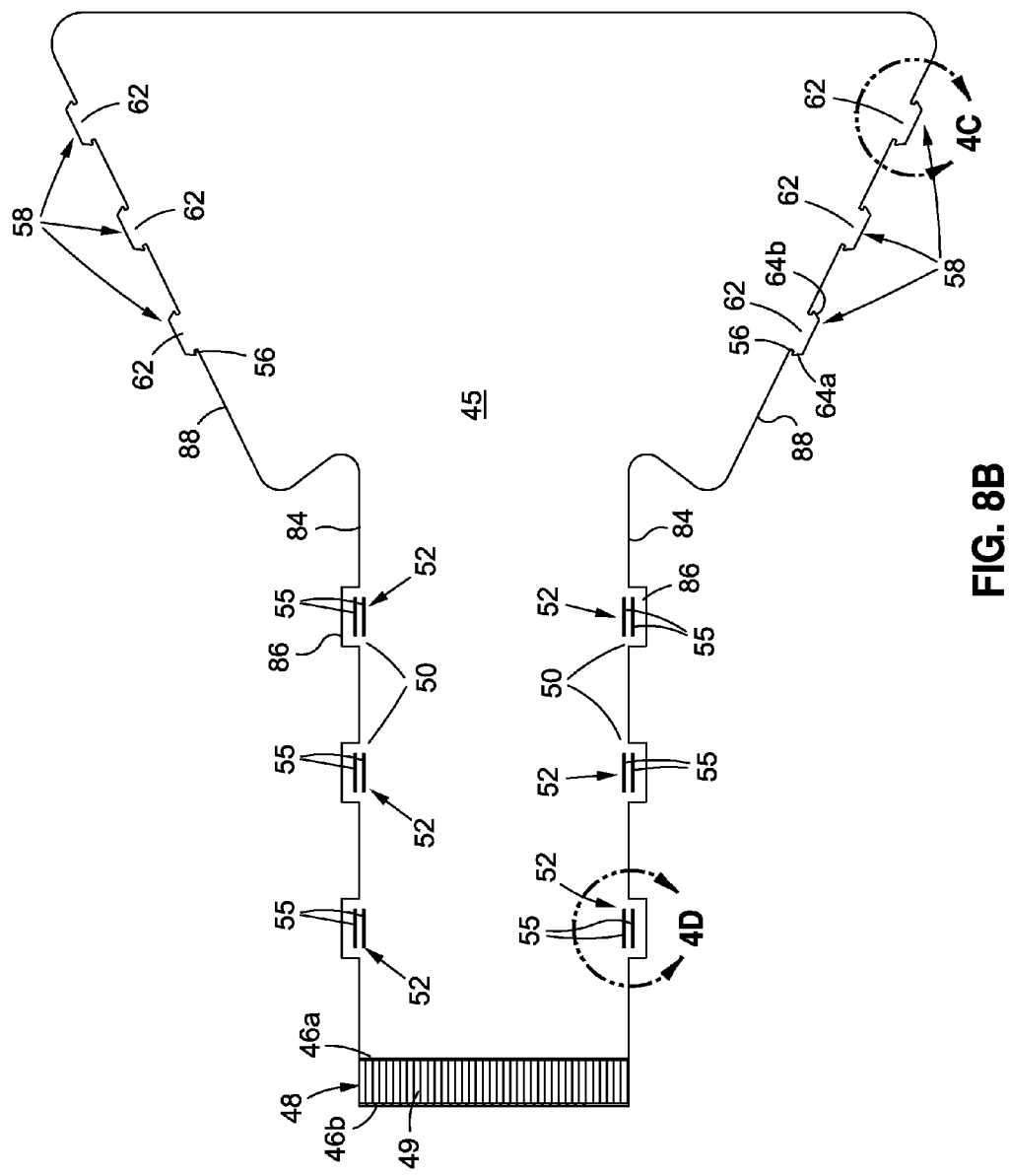
FIG. 8B is an illustration of a top perspective view of one of the embodiments of a single panel structure having tenon blades and mortise slots of the disclosure.
Figure 9:
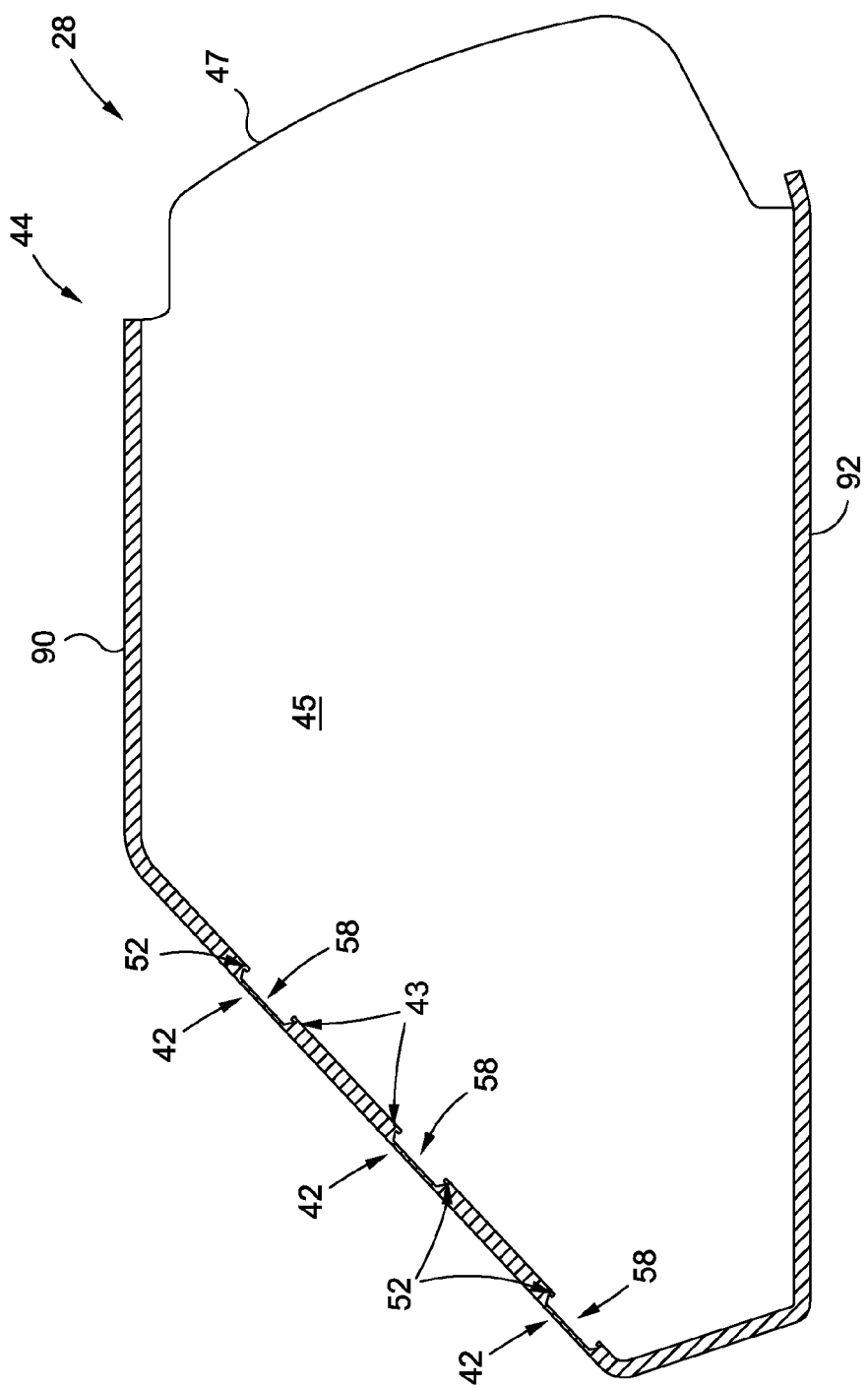
FIG. 9 is an illustration of a side view in partial cross-section of a structure in the form of an aircraft stowage bin made with one of the embodiments of a method of the disclosure.

In one embodiment of the disclosure, as shown in FIGS. 3A-3C, there is provided a self-locking joint 42 (see FIG. 3C) in a panel structure 44 (see FIG. 3C). FIG. 3A is an illustration of an enlarged, fragmentary, front view of a panel structure 44 having one of the embodiments of a tenon extension 58 of the disclosure. FIG. 3B is an illustration of an enlarged, fragmentary, front view of the panel structure 44 of FIG. 3A having one of the embodiments of a mortise opening 52 of the disclosure. FIG. 3C is an illustration of a sectional front view of one of the embodiments of a self-locking joint 42 of the disclosure. FIGS. 8A and 8B are illustrations of a top perspective view of one of the exemplary embodiments of the panel structure 44 shown in a flat, pre-formed state. FIG. 9 is an illustration of a side view in partial cross-section of one of the embodiments of the self-locking joint 42 in one of the exemplary embodiments of the panel structure 44, such as a panel structure 44 that forms an aircraft interior stowage bin 28. FIG. 9 shows the panel structure 44 in a folded, formed state.

The panel structure 44 preferably comprises at least two facesheets 46a, 46b (see FIGS. 3A, 8A) having a core portion 48 (see FIG. 8A) sandwiched therebetween. Preferably, the core portion 48 is disposed between the two facesheets 46a, 46b. The panel structure 44 preferably comprises a honeycomb core composite sandwich panel 45 (see FIG. 8A). The two facesheets 46a, 46b, also referred to as "skins", may be made of a fiberglass resin, a graphite resin, a prepreg composite material, or another suitable composite material and may be formed by laying up the materials in a known layup process. The two facesheets 46a, 46b may also be formed of a lightweight metal material, such as aluminum, or a combination of a metal and composite material. The core portion 48 preferably comprises a honeycomb core 49 (see FIG. 8A) that is lightweight and high strength. The core portion 48 may further be comprised of a foam material such as an open cell foam; a polymeric, cellular solid foam; a melamine foam; a closed cell foam; or another suitable foam material. The core portion 48 may also be formed of a lightweight metal material, such as aluminum, or a combination of a metal and composite material.

The self-locking joint 42 (see FIGS. 3C, 9) comprises at least one mortise opening 52 (see FIGS. 3B, 8A, 8B) formed in a first portion 50 (see FIGS. 8A, 8B) of the panel structure 44. The at least one mortise opening 52 preferably has self-locking end portions 54a, 54b (see FIGS. 3B, 8A).

Figure 4A:
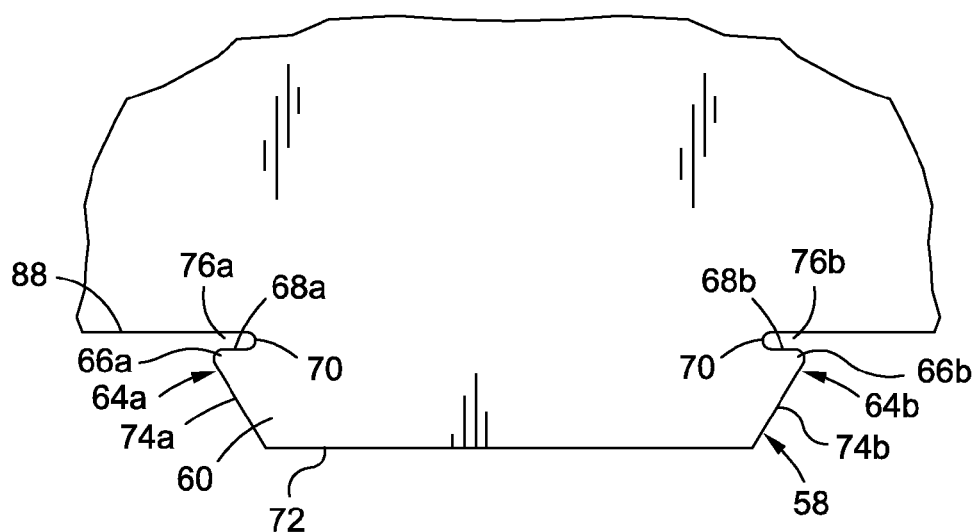
FIG. 4A is an enlarged, fragmentary, front view of one of the embodiments of a tenon tab of the disclosure.
Figure 4B:
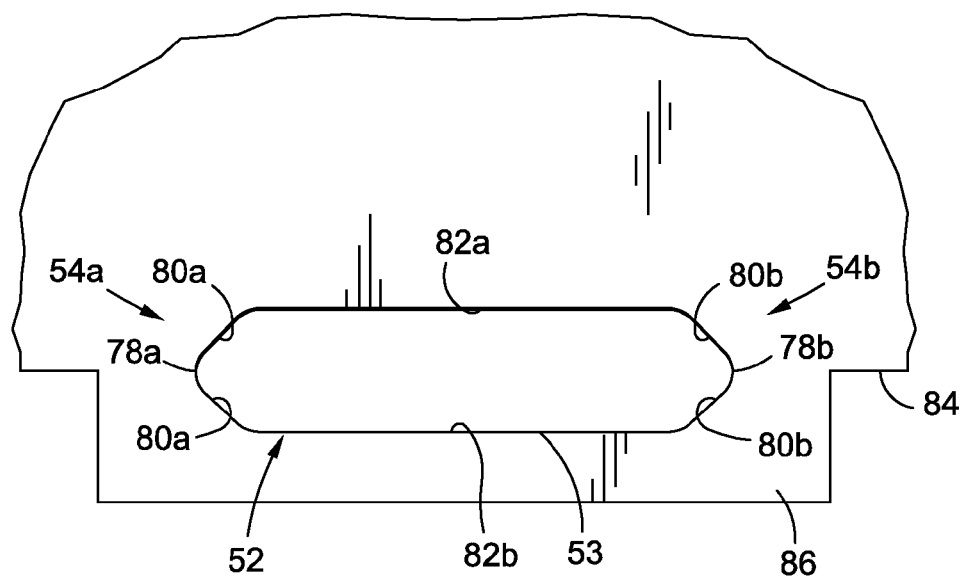
FIG. 4B is an enlarged, fragmentary, front view of one of the embodiments of a mortise pocket of the disclosure.

In one embodiment, the at least one mortise opening 52 comprises a mortise pocket 53 (see FIGS. 4B, 8A). FIG. 4B is an enlarged, fragmentary, front view of one of the embodiments of the mortise pocket 53 of the disclosure. As shown in FIG. 4B, the mortise opening 52, in the form of mortise pocket 53, comprises self-locking end portions 54a, 54b. The self-locking end portion 54a comprises a tip portion 78a and angled portions 80a. The self-locking end portion 54b comprises a tip portion 78b and angled portions 80b. The mortise opening 52, in the form of mortise pocket 53, further comprises a first side 82a and a second side 82b being elongated and parallel to each other.

Figure 4C:
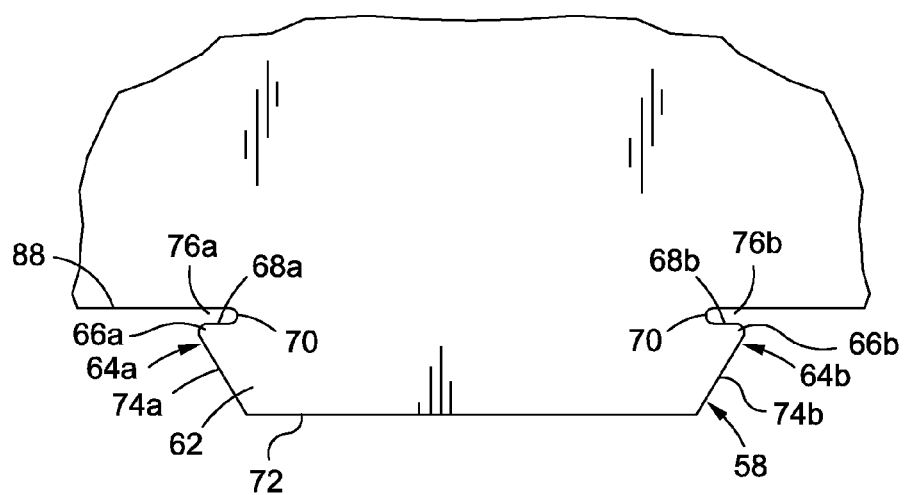
FIG. 4C is an enlarged, fragmentary, front view of one of the embodiments of a tenon blade of the disclosure.
Figure 4D:
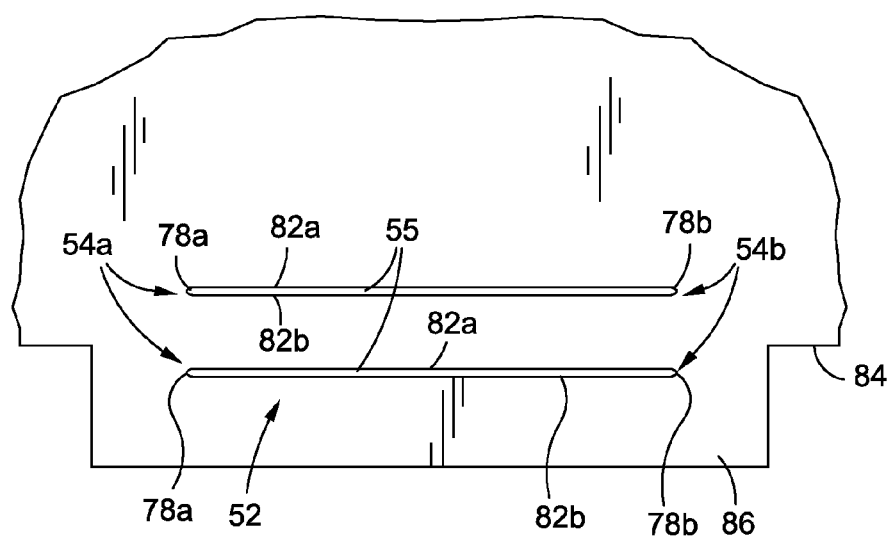
FIG. 4D is an enlarged, fragmentary, front view of one of the embodiments of a mortise slot of the disclosure.

In another embodiment, the at least one mortise opening 52 comprises at least one mortise slot 55 (see FIGS. 4D, 8B). FIG. 4D is an enlarged, fragmentary, front view of one of the embodiments of the mortise slot 55 of the disclosure. FIG. 4D shows two mortise slots 55. As shown in FIG. 4D, the mortise slots 55 may be formed in the panel structure in a parallel configuration. As further shown in FIG. 4D, each mortise slot 55 comprises self-locking end portions 54a, 54b having tip portions 78a, 78b, respectively. As further shown in FIG. 4D, each mortise slot 55 further comprises a first side 82a and a second side 82b being elongated and parallel to each other.

The self-locking joint 42 (see FIGS. 3C, 9) further comprises at least one tenon extension 58 (see FIGS. 3A, 8A, 8B) formed on a second portion 56 (see FIGS. 8A, 8B) of the panel structure 44. The at least one tenon extension 58 preferably has flexible self-locking members 64a, 64b (see FIGS. 3A, 8A, 8B). The flexible self-locking members 64a, 64b are preferably designed to have a sufficient flexibility and/or deformability that enable them to flex or deform when the tenon extension 58 is inserted into a corresponding mortise opening 52 and that enable them to expand back to their original positions once the flexible self-locking members 64a, 64b interlock with the respective self-locking end portions 54a, 54b of the mortise opening 52 to form the self-locking joint 42.

In one embodiment, the at least one tenon extension 58 comprises a tenon tab 60 (see FIGS. 4A, 8A). FIG. 4A is an enlarged, fragmentary, front view of one of the embodiments of the tenon tab 60 of the disclosure. As shown in FIG. 4A, tenon extension 58, in the form of tenon tab 60, comprises flexible self-locking members 64a, 64b. The flexible self-locking members 64a, 64b comprise lip portions 66a, 66b, and engaging portions 68a, 68b, respectively. The flexible self-locking members 64a, 64b may be positioned opposite each and extend laterally from a top portion 70 (see FIG. 4A) of the tenon extension 58 forming spaced areas 76a, 76b (see FIG. 4A) between the engaging portions 68a, 68b and peripheral side 88 (see FIG. 4A). The tenon tab 60 further comprises tapered sides 74a, 74b which preferably taper downwardly from the top portion 70 to a base portion 72 of the tenon tab 60 are elongated and parallel to each other.

In another embodiment, the at least one tenon extension 58 comprises a tenon blade 62 (see FIGS. 4C, 8B). FIG. 4C is an enlarged, fragmentary, front view of one of the embodiments of the tenon blade 62 of the disclosure. As shown in FIG. 4C, tenon extension 58, in the form of tenon blade 62, comprises flexible self-locking members 64a, 64b. The flexible self-locking members 64a, 64b comprise lip portions 66a, 66b, and engaging portions 68a, 68b, respectively. The flexible self-locking members 64a, 64b may be positioned opposite each and extend laterally from a top portion 70 (see FIG. 4C) of the tenon extension 58 forming spaced areas 76a, 76b (see FIG. 4C) between the engaging portions 68a, 68b and peripheral side 88 (see FIG. 4C). The tenon blade 62 further comprises tapered sides 74a, 74b which preferably taper downwardly from the top portion 70 to a base portion 72 of the tenon tab 60 are elongated and parallel to each other.

The flexible self-locking members 64a, 64b of the at least one tenon extension 58 and the self-locking end portions 54a, 54b of the at least one mortise opening 52, in combination, preferably include interlocking elements 43 (see FIGS. 3C, 9) adapted to form the self-locking joint 42 (see FIGS. 3C, 9) in the panel structure 44 (see FIGS. 3C, 9). FIGS. 3C and 9 show the self-locking joint 42 with the interlocking elements 43. Preferably, the mortise opening 52 has a length at its most distant points across that is slightly less than a length of the tenon extension 58 at its most distant points across. Preferably, the at least one tenon extension 58 is of a size that is greater than a size of the at least one mortise opening 52, such that the flexible self-locking members 64a, 64b interlock with the self-locking end portions 54a, 54b in a manner to prevent withdrawal of the at least one tenon extension 58 from the at least one mortise opening 52.

As shown in FIGS. 8A and 8B, multiple mortise openings 52 may be formed in protruding portions 86 (see also FIGS. 4B, 4D) along peripheral sides 84 (see also FIGS. 4B, 4D) of the panel structure 44. Further, as shown in FIGS. 8A and 8B, multiple tenon extensions 58 may be formed along peripheral sides 88 of the panel structure 44. Each mortise opening 52 is preferably shaped and oriented in the panel structure 44 to receive a corresponding tenon extensions 58. FIG. 8A shows mortise openings 52, in the form of mortise pockets 53, and shows tenon extensions 58, in the form of tenon tabs 60. FIG. 8B shows mortise openings, in the form of mortise slots 55, and shows tenon extensions 58, in the form of tenon blades 62. As shown in FIG. 9, the panel structure 44 with the self-locking joint 42 is shown in an exemplary embodiment of the aircraft interior stowage bin 28 having a top end 90, a bottom end 92, and an opening end 47.

Figure 5A:
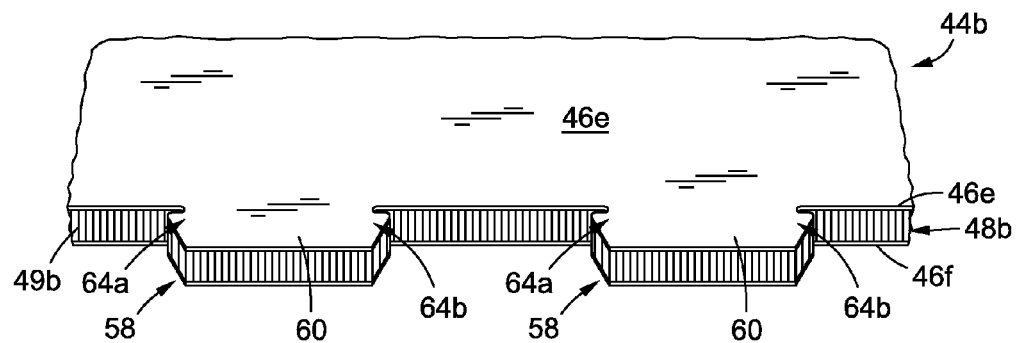
FIG. 5A is an illustration of an enlarged, fragmentary, front perspective view of a second panel structure having one of the embodiments of a tenon extension of the disclosure.
Figure 5B:
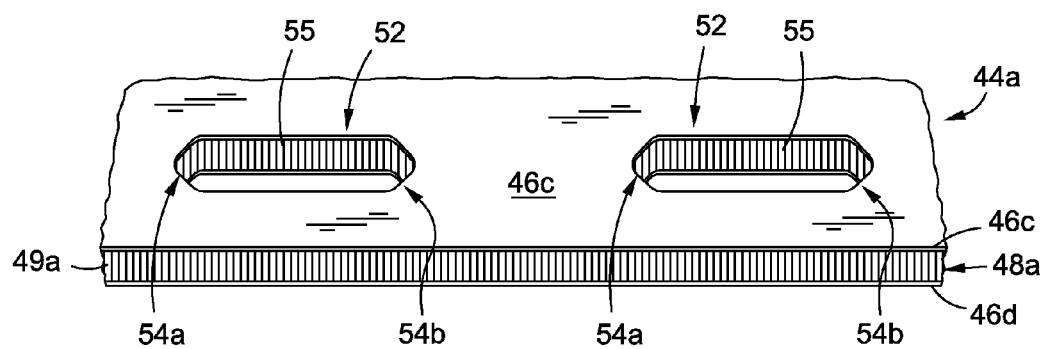
FIG. 5B is an illustration of an enlarged, fragmentary, front perspective view of a first panel structure having one of the embodiments of a mortise opening of the disclosure.
Figure 5C:
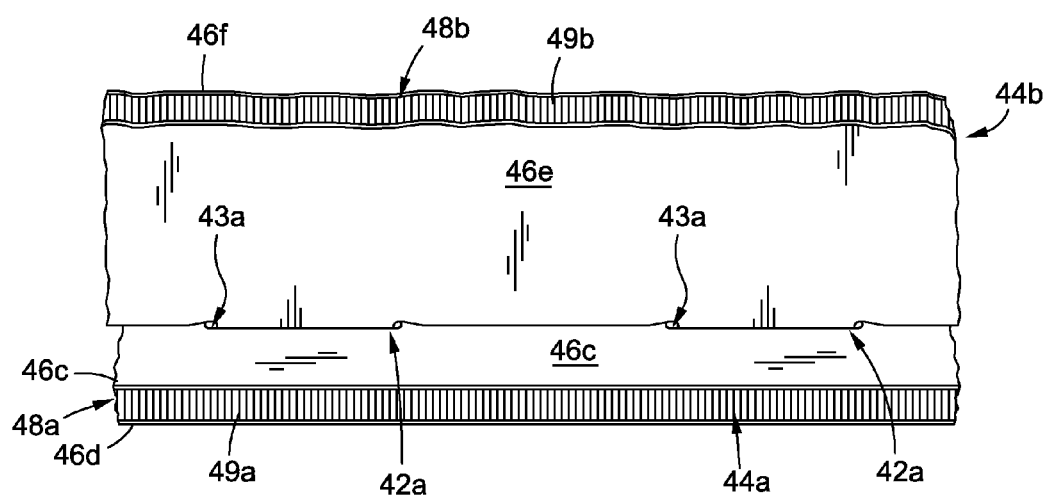
FIG. 5C is an illustration of an enlarged, fragmentary, front perspective view of another one of the embodiments of a self-locking joint of the disclosure.
Figure 6A:
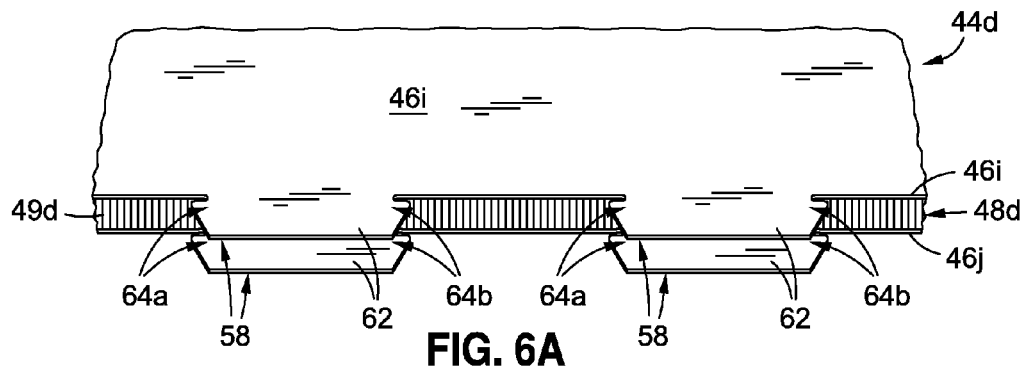
FIG. 6A is an illustration of an enlarged, fragmentary, front perspective view of a second panel structure having another one of the embodiments of a tenon extension of the disclosure.
Figure 6B:
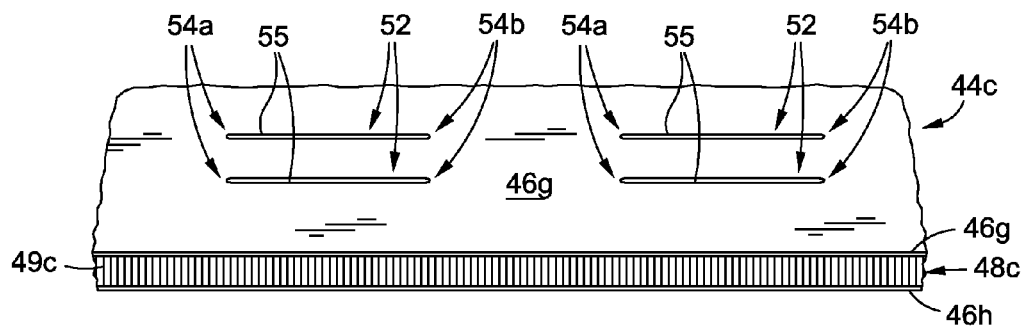
FIG. 6B is an illustration of an enlarged, fragmentary, front perspective view of a first panel structure having another one of the embodiments of a mortise opening of the disclosure.
Figure 6C:
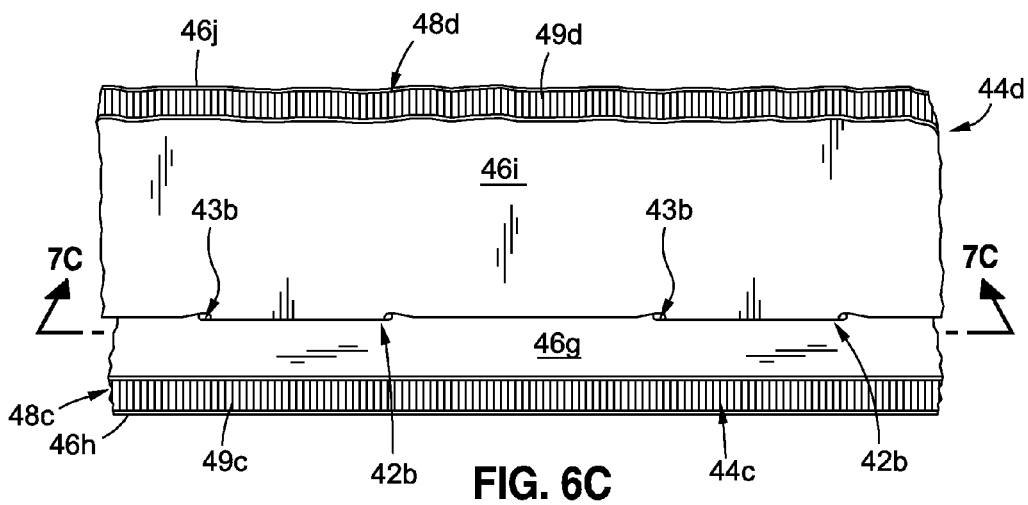
FIG. 6C is an illustration of an enlarged, fragmentary, front perspective view of another one of the embodiments of a self-locking joint of the disclosure.

In another embodiment of the disclosure, as shown in FIGS. 5A-7E, there is provided a self-locking joint 42a (see FIG. 5C) and a self-locking joint 42b (see FIG. 6C), joining together two or more first and second panel structures 44a, 44b (see FIG. 5C) or first and second panel structures 44c, 44d (see FIG. 6C). FIG. 5A is an illustration of an enlarged, fragmentary, front perspective view of a second panel structure 44b having one of the embodiments of a tenon extension 58 in the form of tenon tab 60. FIG. 5B is an illustration of an enlarged, fragmentary, front perspective view of a first panel structure 44a having one of the embodiments of a mortise opening 52 in the form of mortise pocket 53. FIG. 5C is an illustration of an enlarged, fragmentary, front perspective view of another one of the embodiments of a self-locking joint 42a of the disclosure.

As shown in FIG. 5B, the self-locking joint 42a (see FIG. 5C) comprises at least one mortise opening 52 formed in a first panel structure 44a. As shown in FIG. 5B, the at least one mortise opening 52 is in the form of a mortise pocket 53 (see also FIG. 4B). The at least one mortise opening 52 preferably has self-locking end portions 54a, 54b, as discussed in detail above. As further shown in FIG. 5B, the first panel structure 44a comprises at least two first face sheets 46c, 46d and a first core portion 48a sandwiched therebetween. The two first facesheets 46c, 46d, also referred to as "skins", may be made of composite, metal, or a combination of composite and metal materials, as discussed in detail above. The core portion 48a preferably comprises a honeycomb core 49a (see FIG. 5B) that is lightweight and high strength. The core portion 48a may also be made of a foam material or a metal material, as discussed in detail above.

As shown in FIG. 5A, the self-locking joint 42a (see FIG. 5C) further comprises at least one tenon extension 58 formed on a second panel structure 44b. As shown in FIG. 5A, the at least one tenon extension 58 is in the form of a tenon tab 60 (see also FIG. 4A). The at least one tenon extension 58 preferably has flexible self-locking members 64a, 64b (see FIG. 4A), as discussed in detail above. As further shown in FIG. 5A, the second panel structure 44b comprises at least two second face sheets 46e, 46f and a second core portion 48b sandwiched therebetween. The two first facesheets 46e, 46f, also referred to as "skins", may be made of composite, metal, or a combination of composite and metal materials, as discussed in detail above. The core portion 48b preferably comprises a honeycomb core 49b (see FIG. 5A) that is lightweight and high strength. The core portion 48b may also be made of a foam material or a metal material, as discussed in detail above. Preferably, the first panel structure 44a and the second panel structure 44b comprise honeycomb core composite sandwich panels.

The flexible self-locking members 64a, 64b of the at least one tenon extension 58, such as in the form of tenon tab 60, and the self-locking end portions 54a, 54b of the at least one mortise opening 52, such as in the form of mortise pocket 53, in combination, include interlocking elements 43a (see FIG. 5C). As shown in FIG. 5C, the interlocking elements 43a are preferably adapted to form the self-locking joint 42a joining the first panel structure 44a and the second panel structure 44b together. Preferably, the at least one tenon extension 58, in the form of the tenon tab 60, is formed on the second panel structure 44b through the two second face sheets 46e, 46f and through the second core portion 48b. Preferably, the mortise opening 52 has a length at its most distant points across that is slightly less than a length of the tenon extension 58 at its most distant points across. Preferably, the at least one tenon extension 58 is of a size that is greater than a size of the at least one mortise opening 52, such that the flexible self-locking members 64a, 64b interlock with the self-locking end portions 54a, 54b in a manner to prevent withdrawal of the at least one tenon extension 58 from the at least one mortise opening 52.

FIG. 6A is an illustration of an enlarged, fragmentary, front perspective view of a second panel structure 44d having another one of the embodiments of a tenon extension 58 in the form of tenon blades 62. FIG. 6B is an illustration of an enlarged, fragmentary, front perspective view of a first panel structure 44c having another one of the embodiments of a mortise opening 52 in the form of mortise slots 55. FIG. 6C is an illustration of an enlarged, fragmentary, front perspective view of a another one of the embodiments of a self-locking joint 42b of the disclosure.

As shown in FIG. 6B, the self-locking joint 42b (see FIG. 5C) comprises at least one mortise opening 52 formed in a first panel structure 44c. As shown in FIG. 5B, the at least one mortise opening 52 is in the form of mortise slots 55 (see also FIG. 4D). The at least one mortise opening 52 preferably has self-locking end portions 54a, 54b, as discussed in detail above. As further shown in FIG. 6B, the first panel structure 44c comprises at least two first face sheets 46g, 46h and a first core portion 48c sandwiched therebetween. The two first facesheets 46g, 46h, also referred to as "skins", may be made of composite, metal, or a combination of composite and metal materials, as discussed in detail above. The core portion 48c preferably comprises a honeycomb core 49c (see FIG. 5B) that is lightweight and high strength. The core portion 48c may also be made of a foam material or a metal material, as discussed in detail above.

As shown in FIG. 6A, the self-locking joint 42b (see FIG. 6C) further comprises at least one tenon extension 58 formed on a second panel structure 44d. As shown in FIG. 6A, the at least one tenon extension 58 is in the form of a tenon blade 62 (see also FIG. 4CA). The at least one tenon extension 58 preferably has flexible self-locking members 64a, 64b, as discussed in detail above. As further shown in FIG. 65A, the second panel structure 44d comprises at least two second face sheets 46i, 46j and a second core portion 48d sandwiched therebetween. The two second facesheets 46i, 46j, also referred to as "skins", may be made of composite, metal, or a combination of composite and metal materials, as discussed in detail above. The core portion 48d preferably comprises a honeycomb core 49d (see FIG. 6A) that is lightweight and high strength. The core portion 48d may also be made of a foam material or a metal material, as discussed in detail above. Preferably, the first panel structure 44c and the second panel structure 44d comprise honeycomb core composite sandwich panels.

The flexible self-locking members 64a, 64b of the at least one tenon extension 58, such as in the form of tenon blade 62, and the self-locking end portions 54a, 54b of the at least one mortise opening 52, such as in the form of mortise pocket 53, in combination, include interlocking elements 43b (see FIG. 6C). As shown in FIG. 6C, the interlocking elements 43b are preferably adapted to form the self-locking joint 42b joining the first panel structure 44c and the second panel structure 44d together. Preferably, the mortise opening 52 has a length at its most distant points across that is slightly less than a length of the tenon extension 58 at its most distant points across. Preferably, the at least one tenon extension 58 is of a size that is greater than a size of the at least one mortise opening 52, such that the flexible self-locking members 64a, 64b interlock with the self-locking end portions 54a, 54b in a manner to prevent withdrawal of the at least one tenon extension 58 from the at least one mortise opening 52.

Preferably, the at least one tenon extension 58, in the form of the tenon blade 62, is formed on the second panel structure 44b through either one or both of the two second face sheets 46i, 46j only, and not through the second core portion 48d. For example, in one embodiment, tenon blades 62 may be cut out through both second face sheets 46i, 46j and are not cut out through the second core portion 48d, and in another embodiment, tenon blades 62 may be cut out through one of the second face sheets 46i, 46j and are not cut out through the second core portion 48d.

FIG. 7A is an illustration of an enlarged, fragmentary, front view of the second panel structure 44d of FIG. 6A having another one of the embodiments of the tenon extension 58 in the form of tenon blade 60. FIG. 7A shows the second face sheet 45i with tenon extensions 58 having the flexible self-locking members 64a, 64b. FIG. 7D is an illustration of a cross-sectional side view taken along lines 7C-7C of FIG. 7A. FIG. 7D shows the second facesheets 45i, 45j with the second core portion 48d sandwiched therebetween and shows the tenon blades 60 cut in or through the second face sheets 46i, 46j but not cut in or through the second core portion 48d.

FIG. 7B is an illustration of an enlarged, fragmentary, front view of the first panel structure 44c of FIG. 6B having another one of the embodiments of the mortise opening 52 in the form of mortise slots 55. FIG. 7B shows the first face sheet 46g having the mortise slots 55 with the self-locking end portions 54a, 54b.

FIG. 7C is an illustration of a cross-sectional front view taken along lines 7C-7C of FIG. 6C of another one of the embodiments of the self-locking joint 42b of the disclosure. FIG. 7C shows the self-locking joints 42b with the interlocking elements 43 joining the first panel structure 44c and the second panel structure 44d together. FIG. 7E is an illustration of a cross-sectional side view taken along lines 7E-7E of FIG. 7C. FIG. 7E shows the first panel structure 44c with the first facesheets 45h, 45g and the first core portion 48c joined together to the second panel structure 44d with the second facesheets 45i, 45j and the second core portion 48d and shows the tenon blades 60 inserted through the mortise slots 55.

Figure 10:
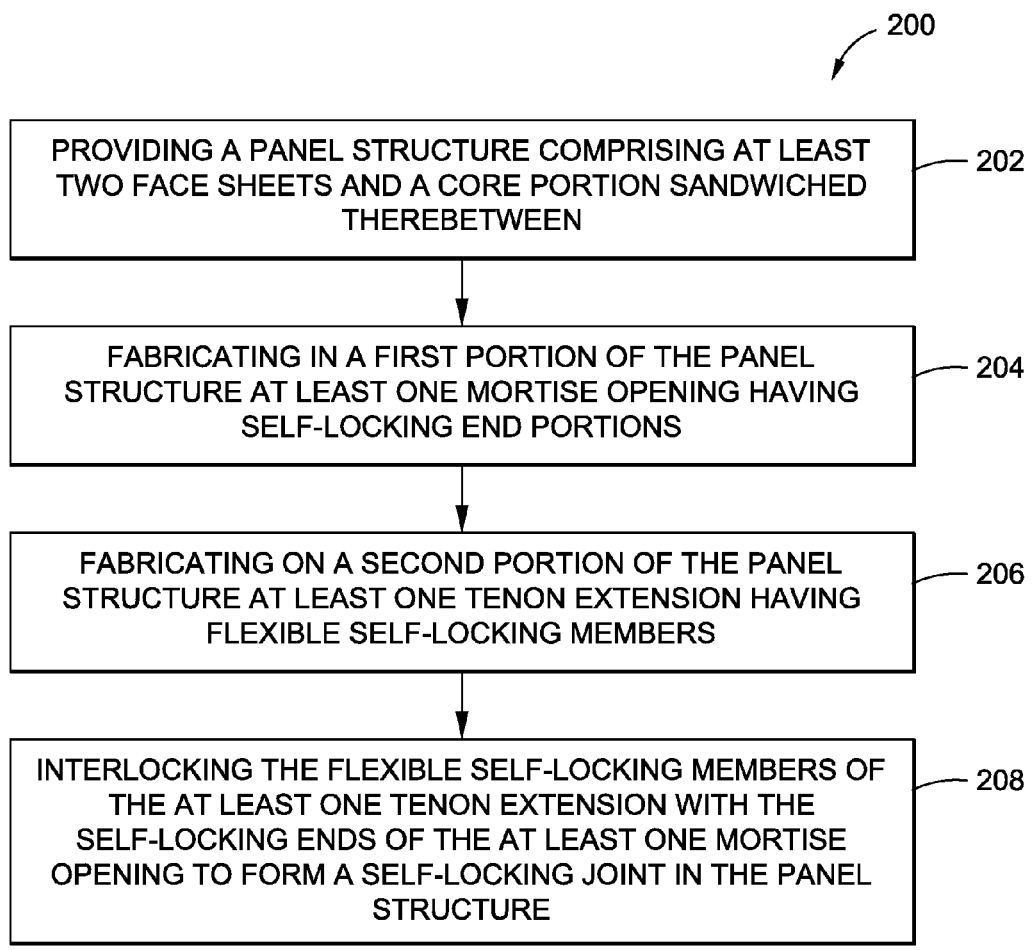
FIG. 10 is an illustration of a flow diagram of an exemplary embodiment of a method of the disclosure; and, FIG. 11 is an illustration of a flow diagram of an exemplary embodiment of another method of the disclosure.

In another embodiment of the disclosure, there is provided a method 200 of fabricating a self-locking joint 42 (see FIGS. 3C, 9) in a panel structure 44 (see FIGS. 3C, 8A, 8B). FIG. 10 is an illustration of a flow diagram of an exemplary embodiment of the method 200 of the disclosure. As shown in FIG. 10, the method 200 comprises step 202 of providing a panel structure 44 (see FIGS. 3C, 8A, 8B) comprising at least two face sheets 46a, 46b (see FIGS. 8A, 8B) and a core portion 48 (see FIGS. 8A, 8B) sandwiched therebetween. The step 202 of providing the panel structure 44 may further comprise providing the panel structure 44 comprising a honeycomb core composite sandwich panel 45 (see FIGS. 8A, 8B, 9).

As shown in FIG. 10, the method 200 further comprises step 204 of fabricating in a first portion 50 (see FIGS. 8A, 8B) of the panel structure 44 at least one mortise opening 52 (see FIGS. 3B, 8A, 8B) having self-locking end portions 54a, 54b (see FIG. 3B). The step 204 of fabricating in the first portion 50 of the panel structure 44 may further comprise fabricating at least one mortise opening 52 comprising a mortise pocket 53 (see FIGS. 4B, 8A) or a mortise slot (see FIGS. 4D, 8B).

As shown in FIG. 10, the method 200 further comprises step 206 of fabricating on a second portion 56 (see FIGS. 8A, 8B) of the panel structure 44 (see FIGS. 8A, 8B) at least one tenon extension 58 (see FIGS. 3A, 8A, 8B) having flexible self-locking members 64a, 64b (see FIGS. 3A, 8A, 8B). The step 206 of fabricating on the second portion 56 of the panel structure 44 may further comprise fabricating at least one tenon extension 58 comprising a tenon tab 60 (see FIGS. 4A, 8A) or a tenon blade 62 (see FIGS. 4C, 8B). The tenon tab 60 is preferably formed on the second portion 56 of the panel structure 44 through the two face sheets 46a, 46b and through the core portion 48. The tenon blade 62 is preferably formed on the second portion 56 of the panel structure 44 through only the two face sheets 46a, 46b and not through the core portion 48.

The step 206 of fabricating on the second portion 56 of the panel structure 44 may further comprise fabricating at least one tenon extension 58 having tapered sides 74a, 74b (see FIGS. 4A, 4C) adapted for insertion into the at least one mortise opening 52 (see FIGS. 4B, 4D). Preferably, the at least one tenon extension 58 is of a size that is greater than a size of the at least one mortise opening 52, such that the flexible self-locking members 64a, 64b interlock with the self-locking end portions 54a, 54b in a manner to prevent withdrawal of the at least one tenon extension 58 from the at least one mortise opening 52. Preferably, the mortise opening 52 has a length at its most distant points across that is slightly less than a length of the tenon extension 58 at its most distant points across.

As shown in FIG. 10, the method 200 further comprises step 208 of interlocking the flexible self-locking members (see FIGS. 3A, 8A, 8B) of the at least one tenon extension 58 (see FIGS. 3A, 8A, 8B) with the self-locking end portions 54a, 54b (see FIGS. 3B, 8A, 8B) of the at least one mortise opening 52 (see FIGS. 3B, 8A, 8B) to form a self-locking joint 42 (see FIGS. 3C, 9) in the panel structure 44 (see FIGS. 3C, 9).

For the method 200, the fabricating of the at least one mortise opening 52 and the at least one tenon extension 58 may comprise using a computerized numerically controlled (CNC) process and apparatus and a cutting process and apparatus to form or cut the at least one mortise opening 52 in the panel structure 44 (see FIGS. 3B, 8A, 8B), and to cut the at least one tenon extension 58 on the panel structure 44 (see FIGS. 3A, 8A, 8B). However, other suitable known forming or cutting processes and devices may be used as well. Preferably, the self-locking joint 42 (see FIG. 3C) in the panel structure 44 secures the at least one tenon extension 58 in the at least one mortise opening 52 without use of any additional fixtures, fasteners, adhesive tape, and/or clamp devices.

The method 200 may further comprise using the panel structure 44 with the self-locking joint 42 in a structure 26 (see FIG. 1), such as an aircraft interior structure. The aircraft interior structure may comprise, for example, an aircraft interior stowage bin 28 (see FIGS. 1, 9), an aircraft interior closet 29 (see FIG. 1), an aircraft storage compartment (not shown), or another suitable aircraft interior structure. The method 200 may further comprise using the panel structure 44 with the self-locking joint 42 in any number of other structures having joints that join panel structures together.

Figure 11:
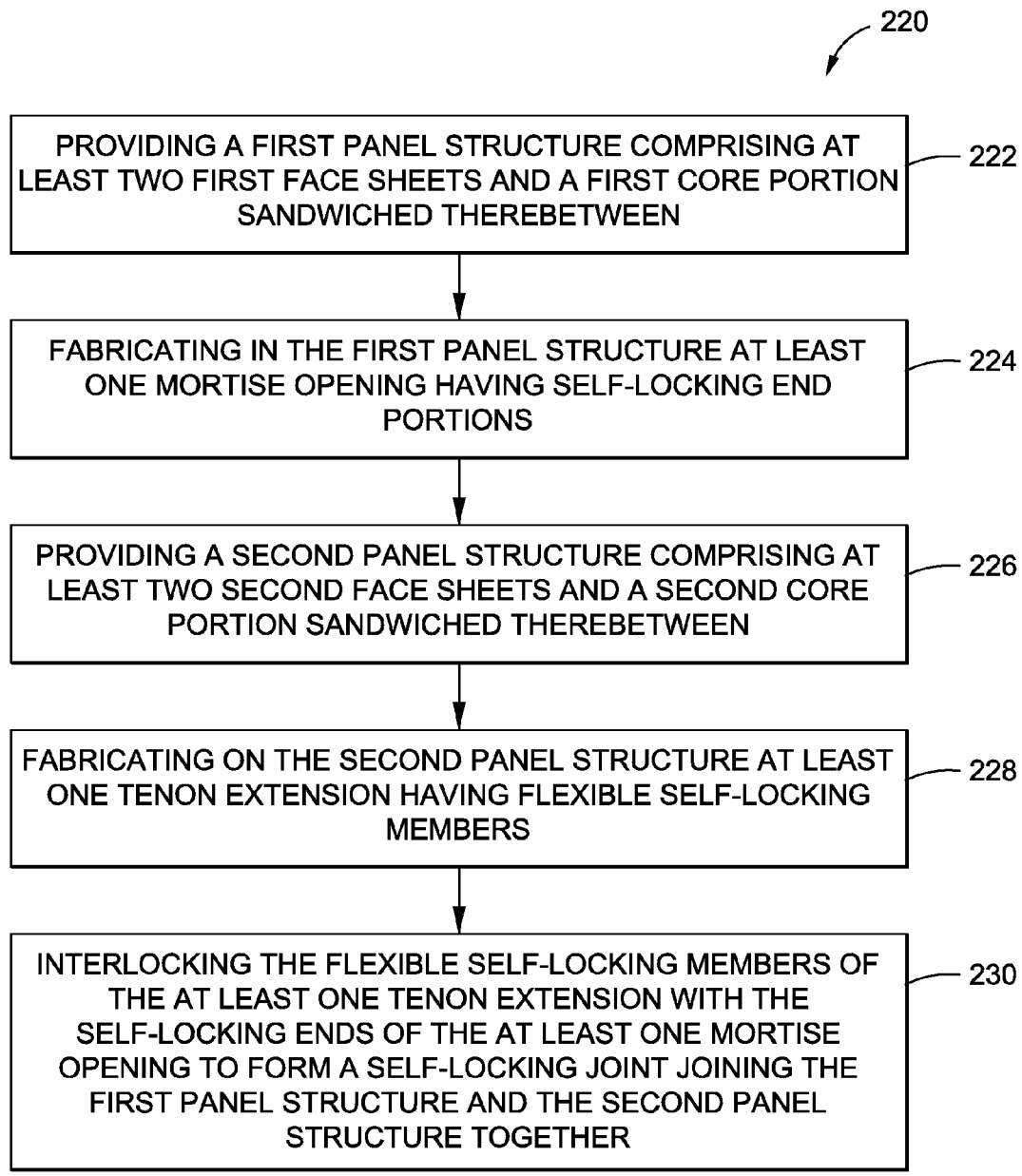

In another embodiment of the disclosure, there is provided a method 220 (see FIG. 11) for joining together two or more panel structures 44a, 44b (see FIG. 5A-5C) or 44d, 44c (see FIGS. 6A-6C). FIG. 11 is an illustration of a flow diagram of an exemplary embodiment of the method 220 of the disclosure. As shown in FIG. 11, the method 220 comprises step 222 of providing a first panel structure 44a (see FIG. 5B) or 44c (see FIG. 6B) comprising at least two first face sheets 46c, 46d (see FIG. 5B) or 46g, 46h (see FIG. 6B) and a first core portion 48a (see FIG. 5B) or 48c (see FIG. 6B) sandwiched therebetween. The first panel structures 44a and 44c preferably comprise honeycomb core composite sandwich panels.

As shown in FIG. 11, the method 220 further comprises step 224 of fabricating in the first panel structure 44a (see FIG. 5B) or 44c (see FIG. 6B) at least one mortise opening 52 (see FIGS. 5B, 6B) having self-locking end portions 54a, 54b (see FIGS. 5B, 6B). The step 224 of fabricating in the first panel structure 44 (see FIG. 5B) or 44c (see FIG. 6B) may further comprise fabricating at least one mortise opening 52 comprising a mortise pocket 53 (see FIGS. 5A, 6A) or a mortise slot (see FIGS. 5B, 6B). As shown in FIG. 11, the method 220 further comprises step 226 of providing a second panel structure 44b (see FIG. 5A) or 44d (see FIG. 6A) comprising at least two second face sheets 46e, 46f (see FIG. 5A) or 46i, 46j (see FIG. 6A) and a second core portion 48b (see FIG. 5A) or 48d (see FIG. 6A) sandwiched therebetween. The second panel structures 44b and 44d preferably comprise honeycomb core composite sandwich panels.

As shown in FIG. 11, the method 220 further comprises step 228 of fabricating on the second panel structure 44b (see FIG. 5A) or 44d (see FIG. 6A) at least one tenon extension 58 having flexible self-locking members 64a, 64b (see FIGS. 5A, 6A). The step 206 of fabricating may further comprise fabricating at least one tenon extension 58 comprising a tenon tab 60 (see FIG. 5A) or a tenon blade 62 (see FIG. 6). As shown in FIG. 5A, the tenon tab 60 is preferably formed on the panel structure 44b through the two face sheets 46e, 46f and through the core portion 48b. As shown in FIG. 6A, the tenon blade 62 is preferably formed through only the two face sheets 46i, 46j and not through the core portion 48d.

As shown in FIG. 11, the method 220 further comprises step 230 of interlocking the flexible self-locking members 64a, 64b (see FIGS. 5A, 6A) of the at least one tenon extension 58 with the self-locking end portions 54a, 54b (see FIGS. 5B, 6B) of the at least one mortise opening 52 to form a self-locking joint 42a (see FIG. 5C) or joint 42b (see FIG. 6C) joining the first panel structure 44a or 44c and the second panel structure 44b or 44d together.

For the method 220, the fabricating of the at least one mortise opening 52 and the at least one tenon extension 58 may comprise using a computerized numerically controlled (CNC) process and apparatus and a cutting process and apparatus to form or cut the at least one mortise opening 52 in the first panel structures 44a or 44c (see FIGS. 5B, 6B), and to cut the at least one tenon extension 58 on the second panel structures 44b or 44d (see FIGS. 5A, 6A). However, other suitable known forming or cutting processes and devices may be used as well. Preferably, the self-locking joints 42a or 42b (see FIGS. 5C, 6C) in the respective first and second panel structures secure the at least one tenon extension 58 in the at least one mortise opening 52 without use of any additional fixtures, fasteners, adhesive tape, and/or clamp devices.

The method 220 may further comprise using the panel structures with the self-locking joint in a structure 26 (see FIG. 1), such as an aircraft interior structure comprising an aircraft interior stowage bin 28 (see FIGS. 1, 9), an aircraft interior closet 29 (see FIG. 1), and an aircraft storage compartment (not shown), or another suitable aircraft interior structure. The method 220 may further comprise using the panel structure 44 with the self-locking joint 42 in any number of other structures having joints that join panel structures together.

As will be appreciated by those of skill in the art, incorporating the novel methods 200, 220 of the disclosure into, e.g., an aircraft interior panel results in a number of substantial benefits. Disclosed embodiments of the self-locking joints 42 (see FIG. 3C), 42a (see FIG. 5C), 42b (see FIG. 6C) and method 200 (see FIG. 10), method 220 (see FIG. 11) provide self-locking joints that do not require the use of any additional fixtures, fasteners, adhesive tape, clamp devices, and/or other holding devices to hold the panel structures together or portions of the panel structures together during the assembly and manufacture of the structures made from the panel structures or portions of the panel structures. This may reduce the labor, materials, and tooling costs involved with installation, use and removal of such additional fixtures, fasteners, adhesive tape, clamp devices, and/or other holding devices. In turn, this may result in a decrease in overall production costs. In addition, the time involved in the installation, use, and removal of such additional fixtures, fasteners, adhesive tape, and/or clamp devices may be reduced, which, in turn, may decrease the overall production costs. Moreover, the overall weight of such known mortise and tenon joint assemblies and such aircraft panel structures may be decreased, which, in turn, may decrease transportation and fuel costs, for example, for aircraft.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of fabricating a self-locking joint in a single composite panel structure, the method comprising:

providing a single composite panel structure comprising at least two composite face sheets and a core portion sandwiched therebetween;

fabricating in protruding portions along a first portion of peripheral sides of the single composite panel structure at least one mortise opening having self-locking end portions, each self-locking end portion comprising a tip portion and an angled portion on each side of the tip portion;

fabricating on a second portion of peripheral sides of the single composite panel structure at least one tenon extension having flexible self-locking members with lip portions and engaging portions, the at least one tenon extension having a size and a length that is greater than a size and a length of the at least one mortise opening, each lip portion located at a top portion of the at least one tenon extension and having a tapered side tapering downwardly and inwardly from the lip portion to a base portion of the at least one tenon extension, and each engaging portion being substantially straight and parallel to the second portion of peripheral sides; and, interlocking the flexible self-locking members of the at least one tenon extension with the self-locking end portions of the at least one mortise opening to form a self-locking joint in the single composite panel structure, wherein when the at least one tenon extension is inserted into the at least one mortise opening, the flexible self-locking members deform, and once the flexible self-locking members interlock with the respective self-locking end portions of the mortise opening to form the self-locking joint, the flexible self-locking members expand back to their original positions.

2. The method of claim 1 wherein providing the single composite panel structure further comprises providing the single composite panel structure comprising a honeycomb core composite sandwich panel.

3. The method of claim 1 wherein fabricating in protruding portions along the first portion of peripheral sides of the single composite panel structure further comprises fabricating at least one mortise opening comprising a mortise pocket or a mortise slot.

4. The method of claim 1 wherein fabricating on the second portion of peripheral sides of the single composite panel structure further comprises fabricating at least one tenon extension comprising a tenon tab formed on the second portion of peripheral sides of the single composite panel structure through the two composite face sheets and through the core portion.

5. The method of claim 1 wherein fabricating on the second portion of peripheral sides of the single composite panel structure further comprises fabricating at least one tenon extension comprising a tenon blade formed on the second portion of peripheral sides of the single composite panel structure through only the two composite face sheets.

6. The method of claim 1 wherein fabricating on the second portion of peripheral sides of the single composite panel structure further comprises fabricating at least one tenon extension having tapered sides adapted for insertion into the at least one mortise opening and wherein the at least one mortise opening has a length at its most distant points across that is less than a length of the at least one tenon extension at its most distant points across, such that the flexible self-locking members interlock with the self-locking end portions in a manner to prevent withdrawal of the at least one tenon extension from the at least one mortise opening.

7. The method of claim 1 wherein fabricating of the at least one mortise opening and the at least one tenon extension comprises using a computerized numerically controlled (CNC) apparatus and a cutting apparatus to cut the at least one mortise opening in the protruding portions along the first portion of peripheral sides of the single composite panel structure and to cut the at least one tenon extension on the second portion of peripheral sides of the single composite panel structure.

8. The method of claim 1 wherein forming the self-locking joint in the single composite panel structure secures the first portion of peripheral sides of the single composite panel structure to the second portion of peripheral sides of the single composite panel structure without use of any additional fixtures, fasteners, adhesive tape, or clamp devices.

9. The method of claim 1 further comprising integrally forming the single composite panel structure with the self-locking joint in an aircraft interior structure.

10. A method for joining two or more honeycomb core composite sandwich panels together, the method comprising:
providing a first honeycomb core composite sandwich panel comprising at least two first composite face sheets and a first honeycomb core sandwiched therebetween;
fabricating in protruding portions along a first portion of peripheral sides of the first honeycomb core composite sandwich panel at least one mortise opening having self-locking end portions, each self-locking end portion comprising a tip portion and an angled portion on each side of the tip portion;
providing a second honeycomb core composite sandwich panel comprising at least two second composite face sheets and a second honeycomb core sandwiched therebetween;
fabricating on a second portion of peripheral sides of the second honeycomb core composite sandwich panel at least one tenon extension having flexible self-locking members with lip portions and engaging portions, the at least one tenon extension having a size and a length that is greater than a size and a length of the at least one mortise opening, each lip portion located at a top portion of the at least one tenon extension and having a tapered side tapering downwardly and inwardly from the lip portion to a base portion of the at least one tenon extension, and each engaging portion being substantially straight and parallel to the second portion of peripheral sides; and,
interlocking the flexible self-locking members of the at least one tenon extension with the self-locking end portions of the at least one mortise opening to form a self-locking joint in the first honeycomb core composite sandwich panel and the second honeycomb core composite sandwich panel together, wherein when the at least one tenon extension is inserted into the at least one mortise opening, the flexible self-locking members deform, and once the flexible self-locking members interlock with the respective self-locking end portions of the mortise opening to form the self-locking joint, the flexible self-locking members expand back to their original positions.

11. The method of claim 10 wherein fabricating in the first honeycomb core composite sandwich panel further comprises fabricating at least one mortise opening comprising a mortise pocket or a mortise slot.

12. The method of claim 10 wherein fabricating on the second honeycomb core composite sandwich panel further comprises fabricating at least one tenon extension comprising a tenon tab formed on the second portion of peripheral sides of the second honeycomb core composite sandwich panel through the two second composite face sheets and through the second honeycomb core.

13. The method of claim 10 wherein fabricating on the second honeycomb core composite sandwich panel further comprises fabricating at least one tenon extension comprising a tenon blade formed on the second portion of peripheral sides of the second honeycomb core composite sandwich panel through only the two second composite face sheets.

14. The method of claim 10 wherein forming the self-locking joint joining the first honeycomb core composite sandwich panel to the second honeycomb core composite sandwich panel secures the first honeycomb core composite sandwich panel to the second honeycomb core composite sandwich panel without use of any additional fixtures, fasteners, adhesive tape, or clamp devices.

15. A self-locking joint in a single composite panel structure, the self-locking joint comprising:
at least one mortise opening formed in protruding portions along a first portion of peripheral sides of the single composite panel structure comprising at least two composite face sheets and a core portion sandwiched therebetween, the at least one mortise opening having self-locking end portions, each self-locking end portion comprising a tip portion and an angled portion on each side of the tip portion; and,
at least one tenon extension formed on a second portion of peripheral sides of the single composite panel structure, the at least one tenon extension having flexible self-locking members with lip portions and engaging portions, the at least one tenon extension having a size and a length that is greater than a size and a length of the at least one mortise opening, each lip portion located at a top portion of the at least one tenon extension and having a tapered side tapering downwardly and inwardly from the lip portion to a base portion of the at least one tenon extension, and each engaging portion being substantially straight and parallel to the second portion of peripheral sides,
wherein the flexible self-locking members of the at least one tenon extension and the self-locking end portions of the at least one mortise opening, in combination, include interlocking elements adapted to form a self-locking joint in the single composite panel structure, wherein when the at least one tenon extension is inserted into the at least one mortise opening, the flexible self-locking members deform, and once the flexible self-locking members interlock with the respective self-locking end portions of the mortise opening to form the self-locking joint, the flexible self-locking members expand back to their original positions.

16. The self-locking joint of claim 15 wherein the single composite panel structure comprises a honeycomb core composite sandwich panel.

17. The self-locking joint of claim 15 wherein the at least one mortise opening comprises a mortise pocket or a mortise slot.

18. The self-locking joint of claim 15 wherein the at least one tenon extension comprises a tenon tab formed on the second portion of peripheral sides of the single composite panel structure through the two composite face sheets and through the core portion.

19. The self-locking joint of claim 15 wherein the at least one tenon extension comprises a tenon blade formed on the second portion of peripheral sides of the single composite panel structure through only the two composite face sheets.

20. A self-locking joint joining two or more honeycomb core composite sandwich panels together, the self-locking joint comprising:
   at least one mortise opening formed in protruding portions along a first portion of peripheral sides of a first honeycomb core composite sandwich panel comprising at least two composite face sheets and a first honeycomb core sandwiched therebetween, the at least one mortise opening having self-locking end portions, each self-locking end portion comprising a tip portion and an angled portion on each side of the tip portion; and,
   at least one tenon extension formed on a second portion of peripheral sides of a second honeycomb core composite sandwich panel comprising at least two second composite face sheets and a second honeycomb core sandwiched therebetween, the at least one tenon extension having a size and a length that is greater than a size and a length of the at least one mortise opening, the at least one tenon extension having flexible self-locking members with lip portions and engaging portions, each lip portion located at a top portion of the at least one tenon extension and having a tapered side tapering downwardly and inwardly from the lip portion to a base portion of the at least one tenon extension, and each engaging portion being substantially straight and parallel to the second portion of peripheral sides,
   wherein the flexible self-locking members of the at least one tenon extension and the self-locking end portions of the at least one mortise opening, in combination, include interlocking elements adapted to form a self-locking joint joining the first honeycomb core composite sandwich panel and the second honeycomb core composite sandwich panel together, wherein when the at least one tenon extension is inserted into the at least one mortise opening, the flexible self-locking members deform, and once the flexible self-locking members interlock with the respective self-locking end portions of the mortise opening to form the self-locking joint, the flexible self-locking members expand back to their original positions.

21. The self-locking joint of claim 20 wherein the at least one mortise opening comprises a mortise pocket or a mortise slot.

22. The self-locking joint of claim 20 wherein the at least one tenon extension comprises a tenon tab formed on the second honeycomb core composite sandwich panel through the two composite face sheets and through the honeycomb core.

23. The self-locking joint of claim 20 wherein the at least one tenon extension comprises a tenon blade formed on the second honeycomb core composite sandwich panel through only the two composite face sheets.

* * * * *